(12) United States Patent  
Wang (10) Patent No.: US 7,535,210 B2  
(45) Date of Patent: May 19, 2009

(54) PREDICTIVE DUTY RATIO GENERATING CIRCUIT AND METHOD FOR SYNCHRONOUS BOOST CONVERTERS OPERATING IN PFM MODE

(75) Inventor: Binan Wang, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 246 days.

(21) Appl. No.: 11/582,707

(22) Filed: Oct. 18, 2006

(65) Prior Publication Data

US 2008/0094861 A1 Apr. 24, 2008

(51) Int. Cl.  
*G05F 1/40* (2006.01)

(52) U.S. Cl. .......................... 323/282; 323/285; 363/16

(58) Field of Classification Search ................. 323/222, 323/224–226, 270–274, 268, 282; 363/60, 363/65, 71, 21.01, 21.08, 80, 97  
See application file for complete search history.

(56) References Cited

U.S. PATENT DOCUMENTS

| | | | |
|---|---|---|---|
| 5,034,871 A | * | 7/1991 | Okamoto et al. ............... 363/15 |
| 6,304,066 B1 | * | 10/2001 | Wilcox et al. ............... 323/282 |
| 6,674,274 B2 | * | 1/2004 | Hobrecht et al. ............ 323/285 |
| 6,724,174 B1 | | 4/2004 | Esteves et al. |
| 6,969,977 B1 | | 11/2005 | Smith |
| 7,068,016 B2 | | 6/2006 | Athari |
| 2006/0152204 A1 | | 7/2006 | Maksimovic et al. |
| 2006/0158165 A1 | | 7/2006 | Inn et al. |

* cited by examiner

*Primary Examiner*—Rajnikant B Patel  
(74) *Attorney, Agent, or Firm*—John J. Patti; Wade J. Brady, III; Frederick J. Telecky, Jr.

(57) ABSTRACT

A synchronous DC-to-DC converter includes an inductor coupled to receive an input voltage, a first transistor having a source coupled to a first reference voltage and a drain coupled to the inductor, and a second transistor having a source coupled to an output conductor to produce an output voltage and a drain coupled to the inductor. A feedback signal representative of a value of the output voltage is generated, and a switch control signal is produced in response to the input voltage and a second reference voltage. The second transistor is turned off in response to the switch control signal each time the inductor current has decayed to zero to prevent reverse current flow through the inductor. A regulating signal indicates whether or not the feedback voltage exceeds the second reference voltage, to regulate the output voltage in a pulse-frequency modulation mode.

26 Claims, 6 Drawing Sheets

PREDICTIVE DUTY RATIO GENERATING CIRCUIT AND METHOD FOR SYNCHRONOUS BOOST CONVERTERS OPERATING IN PFM MODE

BACKGROUND OF THE INVENTION

The present invention relates generally to synchronous DC-to-DC boost converters operating in pulse-frequency modulation (PFM) mode, and more particularly to implementations including improvements which avoid undesired transfer of charge back into an input signal source when the direction of the inductor current reverses, and which also avoid the need for use of a costly, high-speed, high precision comparator to accomplish suitably fast, accurate operation.

Figure 1A:
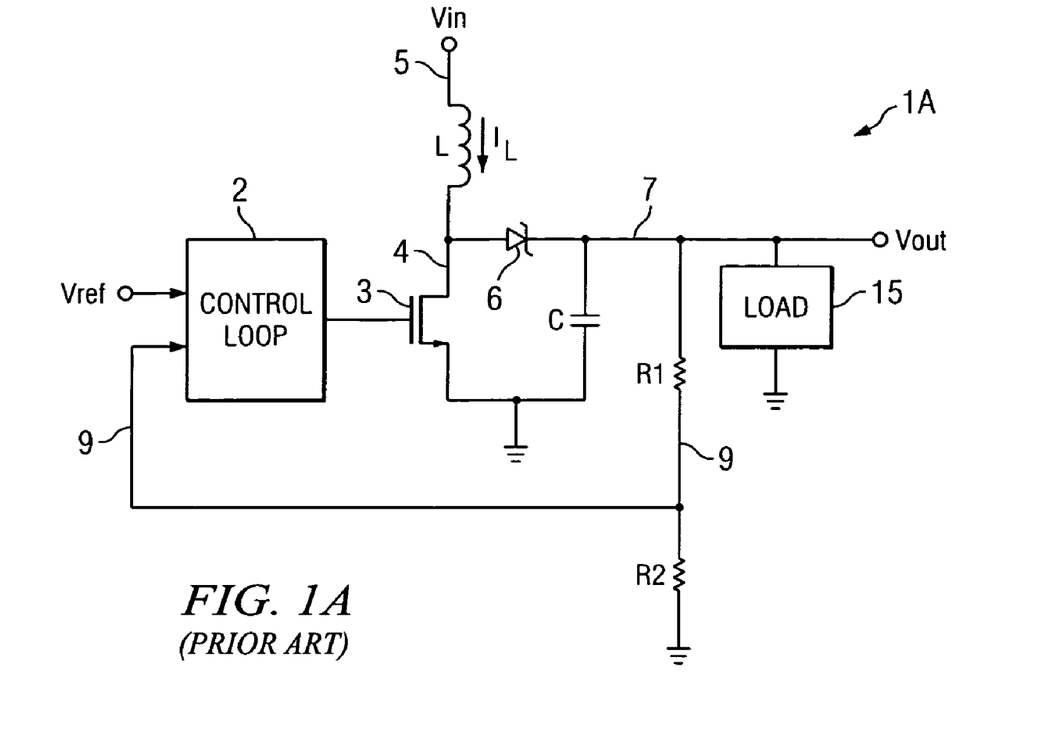
FIG. 1A is a schematic diagram of a basic prior art DC-to-DC boost converter circuit.
Figure 1B:
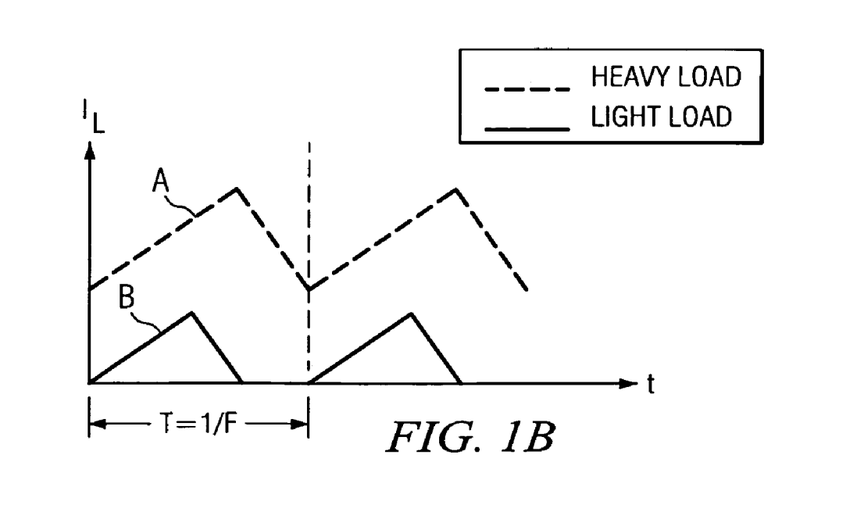
FIG. 1B is a timing diagram illustrates the inductor current $I_L$ in FIG. 1A under both heavy load and light load conditions.

FIG. 1A shows a basic prior art DC-to-DC boost converter 1A. In a synchronous DC-to-DC boost converter the output voltage Vout is generally greater than the input voltage Vin. In boost converter 1A, N-channel power switch transistor 3 is turned on to build up the current $I_L$ flowing through an inductor L to a conductor 4 which is connected to the drain of power switch transistor 3 and also to the anode of a rectifier diode switch 6. The rising slopes of inductor current $I_L$ in FIG. 1B show this build up of $I_L$ while power switch transistor 3 is on. When power switch transistor 3 is turned off, the inductor current $I_L$ continues to flow, and passes in the forward direction through diode 6 and delivers charge through Vout conductor 7 to an external load 15, a capacitor C and series-connected resistors R1 and R2. The falling slopes of the $I_L$ waveform in FIG. 1B show the decay of inductor current $I_L$. The output voltage Vout on conductor 7 is divided by resistor divider R1/R2 to produce a feedback voltage $V_{FB}$ on conductor 9 which is connected to one input of a control loop circuit 2. Another input of control loop circuit 2 is connected to a reference voltage Vref with which the feedback voltage $V_{FB}$ is to be compared. Control loop circuit 2 operates to control the switching of power switch transistor 3 so as to regulate Vout to a constant value which is equal to Vref×(R1+R2)/R2. Capacitor C supplies current to the load 15 during the phase when inductor L is not delivering inductor current $I_L$ to the overall load including load device 15, capacitor C, and voltage divider R1/R2, and also performs the function of reducing ripple in Vout.

An advantage of DC-to-DC boost converter 1A is that under light load conditions as indicated by curve B in FIG. 1B, inductor current $I_L$ will eventually decay only to zero, but no lower because diode 6 can only conduct current in its forward direction. Consequently, problems associated with a reverse flow of inductor current to the input voltage source circuit, as described in the following paragraph, are avoided. However, since efficiency is at the core of DC-to-DC boost converter design, the circuit structure shown in FIG. 1A is not well-suited for low voltage designs because the typical several hundred millivolt voltage drop across diode 6 tends to substantially diminish the overall efficiency, especially in applications in which Vin and Vout both have very low values.

Figure 2A:
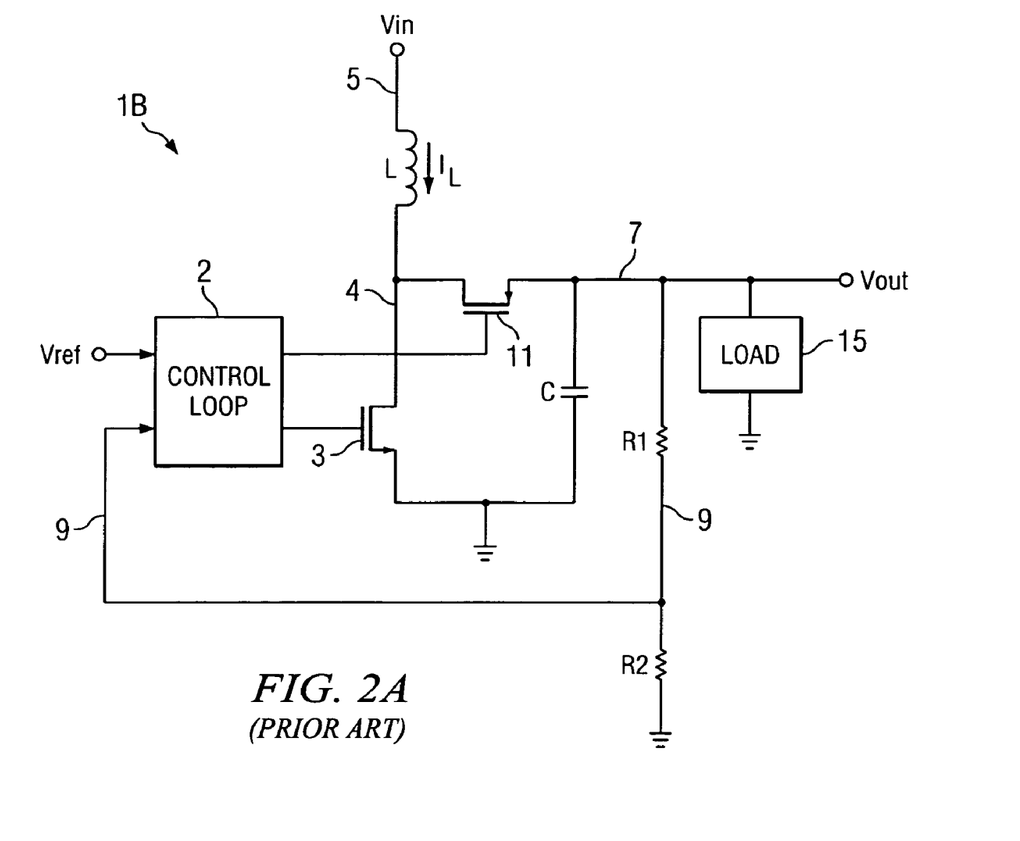
FIG. 2A is a schematic diagram of a prior art synchronous DC-to-DC boost converter circuit.
Figure 2B:
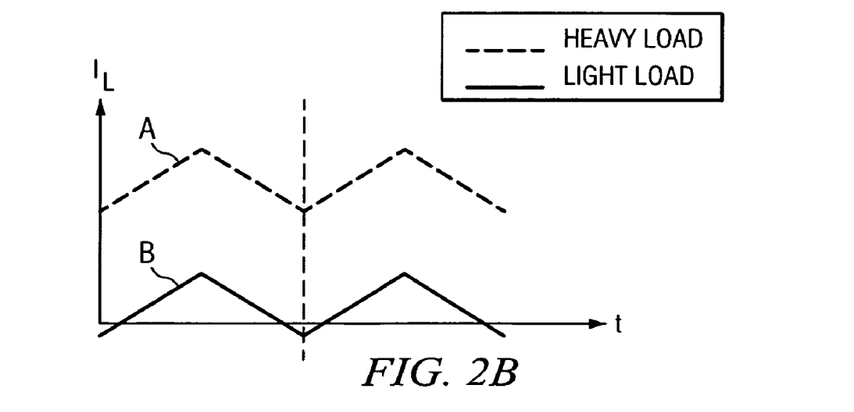
FIG. 2B is a timing diagram illustrates the inductor current $I_L$ in FIG. 2A under both heavy load and light load conditions.

Synchronous DC-to-DC boost converter designs with relatively low values of Vin and Vout generally utilize a "synchronous rectifier" P-channel power transistor 11 as shown in synchronous DC-to-DC boost converter 1B of FIG. 2A rather than a rectifier diode 6 as in FIG. 1A. Since the "on" resistance of P-channel "synchronous rectifier" switching transistor 11 is designed to be very small, the voltage drop across it is significantly lower than the voltage drop across diode 6 in FIG. 1A. This reduces the converter power loss of the boost converter. The circuit structure of FIG. 2A therefore is better suited for low voltage applications than the circuit structure of FIG. 1A. The control signals applied to the gates of N-channel transistor 3 and P-channel synchronous rectifier transistor 11 in FIG. 2A typically are non-overlapping in order to prevent "shoot-through" currents between Vout and ground. When N-channel transistor 3 is turned on it operates to build up the current $I_L$ in inductor L as indicated by the rising slopes of the waveforms of inductor current $I_L$ in FIG. 2B. When transistor 3 is turned off and P-channel output power transistor 11 is turned on it delivers the ramp up are built up inductor current $I_L$ to the total load including capacitor C, voltage divider R1,R2, and external load 15, as generally indicated by the falling slopes of the $I_L$ waveforms in FIG. 2B. Note that curve B for inductor current $I_L$ under light load conditions in FIG. 2B indicates that the inductor current $I_L$ can ramp down to negative values (i.e., undergo a direction reversal) in a synchronous DC-to-DC boost rectifier which does not have any means for preventing reverse inductor flow.

Unlike diode 6 in FIG. 1A, the P-channel output power transistor 11 in FIG. 2A can allow current flow through it in both directions. Therefore, if the direction of inductor current $I_L$ is reversed (which can happen when the load current demand is low or when the switching cycle of output power transistor 11 is of long duration), the current can flow back from Vout through conductor 7 and inductor L to Vin. This is undesirable since it increases the power loss in the boost converter and also because the input voltage source circuit (not shown) which supplies Vin may not be able to handle such "backflow" current.

In order to avoid undesired transfer of charge back from Vout to Vin and into an input signal source, it is necessary to synchronously turn off P-channel transistor 11 just as the inductor current $I_L$ begins to reverse direction, to thereby emulate the function of rectifying diode 6 in Prior Art FIG. 1A without incurring the power loss of diode 6. Referring to synchronous DC-to-DC converter IC in FIG. 3, a typical technique is to provide a switch control circuit 20A which is able to detect if the direction of the inductor current $I_L$ flowing through output power transistor 11 is reversed, and if so, then turn off output power transistor 11. Switch control circuit 20A includes a comparator 12 connected to monitor the voltage between the drain and source of P-channel power output transistor 11. An output of comparator 12 is logically OR'ed with an output 8B of control loop circuit 2 to control output power transistor 11 in synchronization with the output 8A which controls N-channel power transistor 3. When the direction of the inductor current $I_L$ is reversed, that raises the voltage Vout on the source of output power transistor 11 slightly above its drain voltage. Comparator 12 senses the change of direction of inductor current $I_L$ and terminates the "on" cycle (see, for example, FIG. 5) of the power output transistor 11.

However, the foregoing technique requires that comparator 12 have a very small input offset voltage and a very fast response time. As $I_L$ starts reversing direction, inductor current $I_L$ continues to build up (i.e., ramp up) in the reverse direction. If comparator 12 has zero input offset voltage it will change state as soon as it has a positive input voltage as the result of reversal of inductor current $I_L$ through power output transistor 11. P-channel power output transistor 11 is generally designed to be very large in size and therefore has a very small impedance, for example one fourth of an ohm. Consequently, the voltage produced by the relatively small reverse inductor current flowing through the relatively small impedance of power output transistor 11 may be "overwhelmed" by the input offset voltage of comparator 12. If comparator 12 has a positive offset voltage, that means inductor current $I_L$ has to build up to a relatively large negative value to trigger comparator 12, causing it to switch too late, which is undesirable because from the standpoint of power efficiency. In the opposite case, if comparator 12 has a large negative input offset voltage, comparator 12 will be prematurely triggered and change state too soon, which also results in undesired power loss. (A typical CMOS comparator may have an input offset voltage of, for example, +−5 millivolts, which means that in the configuration of FIG. 3 there may be as much as 20 milliamperes of reverse inductor current $I_L$) Also, the response time of comparator 12 may delay the "off" time of switching transistor 11, which shifts the timing of the turn-off of power output transistor 11 further away from the exact instant at which the direction of inductor current $I_L$ is reversed.

Figure 3:
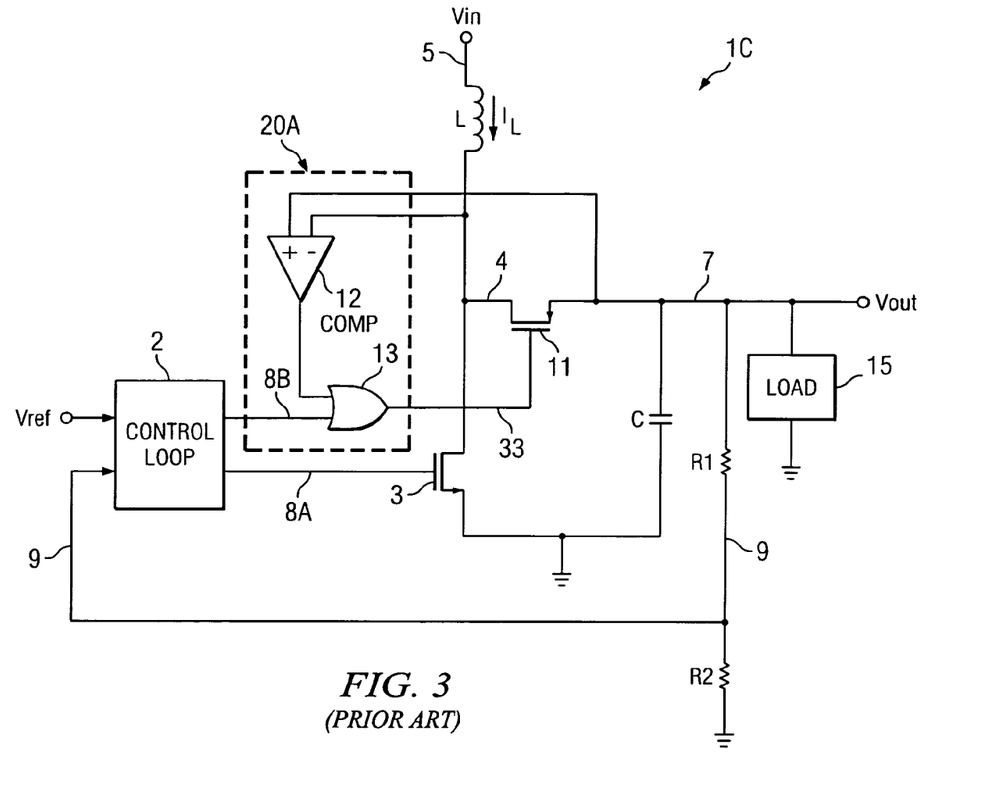
FIG. 3 is a schematic diagram of another prior art synchronous DC-to-DC boost converter circuit which operates to turn off a P-channel output power transistor if the direction of the inductor current is reversed.

Therefore, the comparator 12 of boost converter 1C of FIG. 3 generally needs to be precise, meaning that it needs to have a low input offset voltage, and also needs to be fast, meaning that it needs to have a very short delay time, to prevent unnecessary power loss. However, implementation of such a comparator is generally costly because fast response time or low delay usually necessitates use of circuit implementations that require increased power consumption, and because achieving low input offset voltages often necessitates use of complex, expensive circuit techniques, such as auto-zeroing circuitry.

There is an unmet need for a very accurate synchronous DC-to-DC boost converter which avoids transfer of charge back into an input signal source when the direction of the inductor current changes.

There also is an unmet need for a very accurate synchronous DC-to-DC boost converter that can detect a and prevent reversed inductor current without requiring the use of an expensive, fast, precise comparator.

SUMMARY OF THE INVENTION

It is an object of the invention to provide a very accurate synchronous DC-to-DC boost converter which avoids transfer of charge back into an input signal source when the direction of the inductor current changes.

It is another object of the invention to provide a very accurate synchronous DC-to-DC boost converter that can detect and/or prevent reversed inductor current without requiring the use of an expensive, fast, precise comparator.

Briefly described, and in accordance with one embodiment, the present invention provides a synchronous DC-to-DC converter including an inductor (L) coupled to receive an input voltage (Vin), a first transistor (3) having a source coupled to a first reference voltage (GND) and a drain coupled to the inductor, and a second transistor (11) having a source coupled to an output conductor (7) to produce an output voltage (Vout) and a drain coupled to the inductor. A feedback signal ($V_{FB}$) representative of a value of the output voltage is generated, and a switch control signal ($V_{SW}$) is produced in response to the input voltage and a second reference voltage (Vref) representative of the output voltage (Vout). The second transistor (11) is turned off in response to the switch control signal ($V_{SW}$) to prevent reverse current flow through the inductor. A regulating signal (DISABLE) indicates whether or not the feedback voltage exceeds the second reference voltage, to regulate the output voltage (Vout) in a pulse-frequency modulation mode.

In one embodiment, the invention provides a synchronous DC-to-DC converter including an inductor (L) having a first terminal (5) coupled to receive an input voltage (Vin), a first transistor (3) having a first electrode coupled to a first reference voltage (GND) and a second electrode coupled by a first conductor (4) to a second terminal of the inductor (L), and a second transistor (11) having a first electrode coupled to an output conductor (7) to produce an output voltage (Vout) and a second electrode coupled to the first conductor (4). A feedback circuit (R1,R2) is coupled between the output conductor (7) and the first reference voltage (GND) for producing a feedback voltage ($V_{FB}$) representative of a value of the output voltage (Vout). Regulating circuitry (62) has a first input coupled to receive the feedback voltage ($V_{FB}$), and a second input coupled to receive a second reference voltage (Vref) for producing a regulating signal (DISABLE) indicative of whether or not the feedback voltage ($V_{FB}$) exceeds the second reference voltage (Vref). A non-overlapping buffer (57) includes an input for receiving a switch control signal ($V_{SW}$) and produces a first control signal ($V_{GN}$) on a first output (8A) coupled to a control electrode of the first transistor (3), and a second control signal ($V_{GP}$) on a second output (8B) coupled to a control electrode of the second transistor (11). The non-overlapping buffer (57) includes a control input (61) coupled to receive the regulating signal (DISABLE) for controlling the first ($V_{GN}$) and second ($V_{GP}$) control signals when the feedback voltage ($V_{FB}$) exceeds the second reference voltage (Vref). A duty ratio generation (20C) has a first input coupled to receive the input voltage (Vin), a second input coupled to receive the second reference voltage (Vref), and an output (33) for producing the switch control signal ($V_{SW}$) in such a manner that current ($I_L$) through the inductor (L) has decayed to approximately zero each time the second transistor (11) is turned off so as to prevent reverse current flow through the inductor (L).

In the described embodiment, the feedback circuit (R1,R2) is a voltage divider which produces the feedback voltage ($V_{FB}$) as a scaled-down representation of the output voltage (Vout).

In the described embodiment, the duty ratio generation circuit (20C) includes an operational amplifier (25) having an output (26) coupled to a first input of a first comparator (31), a first resistive divider circuit (21,22,24) coupled between the input voltage (Vin) and the output (26) of the operational amplifier (25), and a second resistive divider circuit (27, 29, 30) coupled between the second reference voltage (Vref) and the first reference voltage (GND). The first resistive divider circuit (21,22,24) includes a first tap conductor (23) coupled to a first input of the operational amplifier (25), and the second resistive divider circuit (27,29,30) includes a second tap conductor (28) coupled to a second input of the operational amplifier (25), a ramp voltage ($V_{RAMP}$) being coupled to a second input of the first comparator (31). In the described embodiment, the first (21,22,24) and second (27,29,30) resistive divider circuits produce voltages on the first (23) and second (28) tap conductors, respectively, so as to cause the first comparator (25) to produce a duty ratio control voltage ($V_M$) on the first input of the first comparator (31) that causes the first comparator (31) to produce the switch control signal ($V_{SW}$) in such a manner that current ($I_L$) through the inductor (L) has decayed to approximately zero each time the second transistor (11) is turned off so as to prevent reverse current flow through the inductor (L).

In the described embodiment, first resistive divider circuit (21,22,24) includes a first resistor (21) having a first terminal coupled to the input voltage (Vin) and a second terminal coupled to a first terminal of a second resistor (22), the second resistor (22) has a second terminal coupled by means of the first tap conductor (23) to a first terminal of a third (24) resistor having a second terminal coupled to the output (26) of the operational amplifier (25). The second resistive divider circuit (27, 29, 30) includes a fourth resistor (27) having a first terminal coupled to the second reference voltage (Vref) and a second terminal coupled by means of the second tap conductor (28) to a first terminal of a fifth resistor (29). The fifth resistor (29) has a second terminal coupled to a first terminal of a sixth resistor (30) having a second terminal coupled to the first reference voltage (GND). A resistance (R3) of the second resistor (22) is equal to a resistance (R4) of the third resistor (24) and a ratio of a resistance (R3) of the first resistor (21) to the resistance (R4) of the second resistor (22) is equal to a ratio of a resistance (R1) of a first resistor (R1) of the voltage divider to a resistance of a second resistor (R2) of the voltage divider, and wherein a resistance (R4) of the fourth resistor (27) is equal to a resistance (R4) of the fifth resistor (29) and a ratio of a resistance (R3) of the sixth resistor (30) to the resistance (R4) of the fifth resistor (29) is equal to the ratio of the resistance (R1) of the first resistor (R1) of the voltage divider to the resistance (R2) of the second resistor (R2) of the voltage divider.

The duty ratio control voltage ($V_M$) has a value that corresponds to a duty ratio D of a ramp-up, ramp-down cycle of current ($I_L$) through the inductor (L) wherein the duty ratio D is a fraction of the period of the ramp-up, ramp-down cycle during which the first transistor (3) is on and 1−D is a fraction of the period of the ramp-up, ramp-down cycle during which the second transistor (11) is on, and wherein the duty ratio D is represented by the simultaneous equations D=1−Vin/Vout and D=Vin/Vref, Vin is the input voltage, Vout is the output voltage, and Vref is a second reference voltage.

In the described embodiment, the regulating circuitry (62) includes a first comparator (59) having a first input coupled to receive the feedback voltage ($V_{FB}$), a second input coupled to receive the second reference voltage (Vref), and an output coupled to a first input of a logical OR'ing circuit (60) having an output coupled to an input of a flip-flop 56, an output (61) of the flip-flop (56) producing the regulating signal (DISABLE) and being coupled by means of an inverter (58) to a second input of the logical OR'ing circuit (60), the flip-flop (56) being clocked by a first clock signal ($CLK_{INT}$).

In a described embodiment, the ramp voltage ($V_{RAMP}$) is generated by a ramp voltage generating circuit (19A) including a current source (42) coupled to the second input (32) of the first comparator (31) and a capacitor (43) and also coupled to a first input of a second comparator (44) having a second input coupled to the second reference voltage (Vref) and an output coupled to a set input of a latch (46). The output of the latch (46) produces a first internal clock signal ($CLK_{INT}$) coupled to an input of a delay circuit (48) and to a control electrode of a capacitor-resetting transistor (45) coupled between the second input (32) of the first comparator (31). The delay circuit (48) produces a delayed output signal ($V_{49}$) coupled to reset the latch (46). In another embodiment, the current source (42A) is controlled in response to phase locked loop circuitry (48) including a phase-frequency detector circuit (50) clocked by a second clock signal ($CLK_{EXT}$) and having an input coupled to receive the delayed output signal ($V_{49}$) and a charge pump loop filter 49 with an input coupled to an output of the phase-frequency detector (50) and an output coupled to an input of a current mirror control transistor (44), wherein the current source (42A) is controlled by the current mirror control transistor (44).

In one embodiment, the invention provides a method of operating a synchronous DC-to-DC converter including an inductor (L) having a first terminal (5) coupled to receive an input voltage (Vin), a first transistor (3) having a first electrode coupled to a first reference voltage (GND) and a second electrode coupled by a first conductor (4) to a second terminal of the inductor (L), and a second transistor (11) having a first electrode coupled to an output conductor (7) to produce an output voltage (Vout) and a second electrode coupled to the first conductor (4), the method including producing a feedback signal ($V_{FB}$) representative of a value of the output voltage (Vout), producing a switch control signal ($V_{SW}$) in response to the input voltage (Vin) and a second reference voltage (Vref) in such a manner that current ($I_L$) through the inductor (L) has decayed to approximately zero each time the second transistor (11) is turned off in response to the switch control signal ($V_{SW}$) so as to prevent reverse current flow through the inductor (L). The method includes producing a regulating signal (DISABLE) indicative of whether or not the feedback voltage ($V_{FB}$) exceeds the second reference voltage (Vref) and regulating the output voltage (Vout) in a pulse-frequency modulation mode to a predetermined value in response to the regulating signal (DISABLE). In one embodiment, the producing of the switch control signal includes producing the switch control signal ($V_{SW}$) by generating a duty ratio control signal ($V_M$) wherein the duty ratio control voltage ($V_M$) has a value that corresponds to a duty ratio D of a ramp-up, ramp-down cycle of current ($I_L$) through the inductor (L) wherein the duty ratio D is the fraction of the period of the ramp-up, ramp-down cycle during which the first transistor (3) is on and 1−D is the fraction of the period of the ramp-up, ramp-down cycle during which the second transistor (11) is on, and wherein the duty ratio D is represented by the simultaneous equations D=1−Vin/Vout and D=Vin/Vref, Vin is the input voltage, Vout is the output voltage, and Vref is a second reference voltage, in response to the input voltage (Vout) and the second reference voltage (Vref), and comparing the duty ratio control signal ($V_M$) with a ramp voltage ($V_{RAMP}$).

In one embodiment, the invention provides a synchronous DC-to-DC converter including an inductor (L) having a first terminal (5) coupled to receive an input voltage (Vin), a first transistor (3) having a first electrode coupled to a first reference voltage (GND) and a second electrode coupled by a first conductor (4) to a second terminal of the inductor (L), and a second transistor (11) having a first electrode coupled to an output conductor (7) to produce an output voltage (Vout) and a second electrode coupled to the first conductor (4), means for producing a feedback signal ($V_{FB}$) representative of a value of the output voltage (Vout), means for producing a switch control signal ($V_{SW}$) in response to the input voltage (Vin) and a second reference voltage (Vref) in such a manner that current ($I_L$) through the inductor (L) has decayed to approximately zero each time the second transistor (11) is turned off in response to the switch control signal ($V_{SW}$) so as to prevent reverse current flow through the inductor (L), and means for producing a regulating signal (DISABLE) indicative of whether or not the feedback voltage ($V_{FB}$) exceeds the second reference voltage (Vref) and regulating the output voltage (Vout) and a pulse-frequency modulation mode to a predetermined value in response to the regulating signal (DISABLE).

DETAILED DESCRIPTION OF THE PREFERRED EMBODIMENTS

Figure 4A:
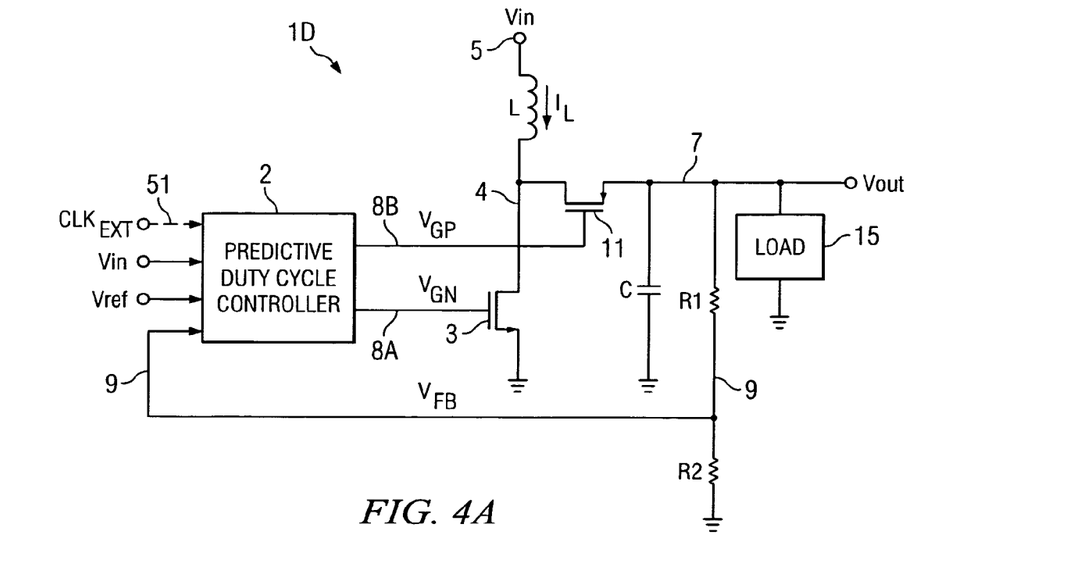
FIG. 4A is a schematic diagram of a synchronous DC-to-DC boost converter circuit according to the present invention.

Referring to FIG. 4A, synchronous DC-to-DC boost converter 10 (referred to as "boost converter 10") includes a predictive duty cycle controller 2 which receives Vin as an input voltage, Vref as a reference voltage, a feedback control signal $V_{FB}$ on conductor 9, and either an internal or external clock signal. An output $V_{GN}$ of predictive duty cycle controller 2 is coupled by conductor 8A to the gate of N-channel output power transistor 3, the source of which is connected to ground. The drain of transistor 3 is connected by conductor 4 to one terminal of an external (off-chip) inductor L (which, for example, may have and inductance value from 1 to 10 µH), the other terminal of which is connected by conductor 5 to an input circuit or device (not shown) that produces the input voltage Vin. A current $I_L$ flows through inductor L. Conductor 4 is also connected to the drain of P-channel output power transistor 4, the source of which is connected by conductor 7 to provide the output voltage Vout. Conductor 7 is coupled to ground by an external capacitor C (which, for example, may have a capacitance of 10 to 20 µF), and also is coupled to one terminal of resistor R1, the other terminal of which is connected by conductor 9 to one terminal of resistor R2. The other terminal of resistor R2 is connected to ground, so that resistors R1 and R2 form a voltage divider that generates feedback signal $V_{FB}$ as a scaled-down representation of the boosted output voltage Vout.

The gate of power output transistor 11 is connected by conductor 8B to receive another output $V_{GP}$ of predictive duty cycle controller 2, produced in response to Vin, Vref, and $V_{FB}$. Predictive duty cycle controller 2 can be implemented by means of the circuitry shown in subsequently described FIG. 6.

Predictive duty cycle controller 2 determines the transition point (41 in FIG. 5) at which the ramp-up inductor current $I_L$ abruptly becomes a ramp-down current. (This is in contrast to the prior art, which directly controls the turn-off point (point 40 in FIG. 5) of P-channel transistor 11 in response to detecting of when the direction of inductor current $I_L$ is reversed.) A predictive duty ratio generator circuit is included in predictive duty cycle controller 2 to enable it to determine the transition point 41.

Figure 4B:
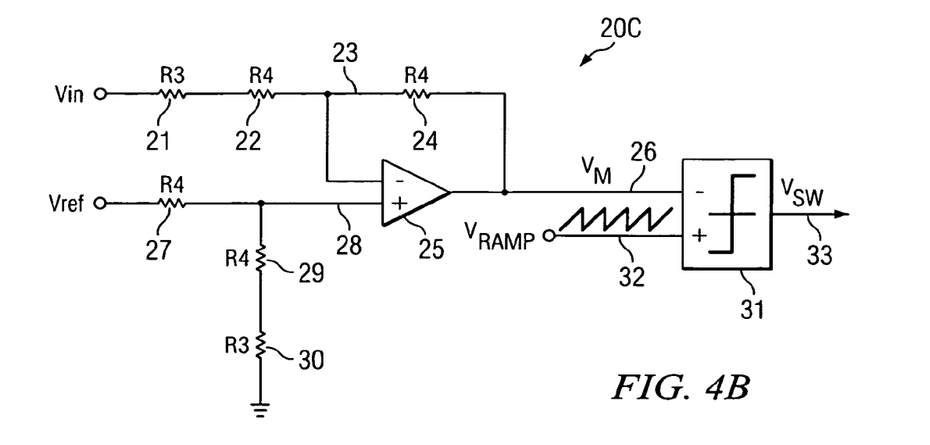
FIG. 4B is a schematic diagram of a predictive duty cycle ratio generating circuit which can be used in block 2 of FIG. 4A.

Referring to FIG. 4B, predictive duty ratio generation circuit 20C includes a resistor 21 of resistance R3 having one terminal connected to receive Vin and a second terminal connected to a first terminal of a resistor 22 having a resistance R4. A second terminal of resistor 22 is connected by conductor 23 to the (−) input of an operational amplifier 25 and also to one terminal of a feedback resistor 24 having a resistance R4. A second terminal of feedback resistor 24 is connected by conductor 26 to the output of operational amplifier 25. A resistor 27 of resistance R4 is coupled to reference voltage Vref, and a second terminal of resistor 27 is connected by conductor 28 to the (+) input of operational amplifier 25, and also is coupled to ground through series-coupled resistors 29 and 30 of resistances R4 and R3, respectively. The output 26 of operational amplifier 25 produces a duty ratio signal $V_M$ on the (−) input of comparator 31, which can be a relatively simple, inexpensive circuit.

Figure 6:
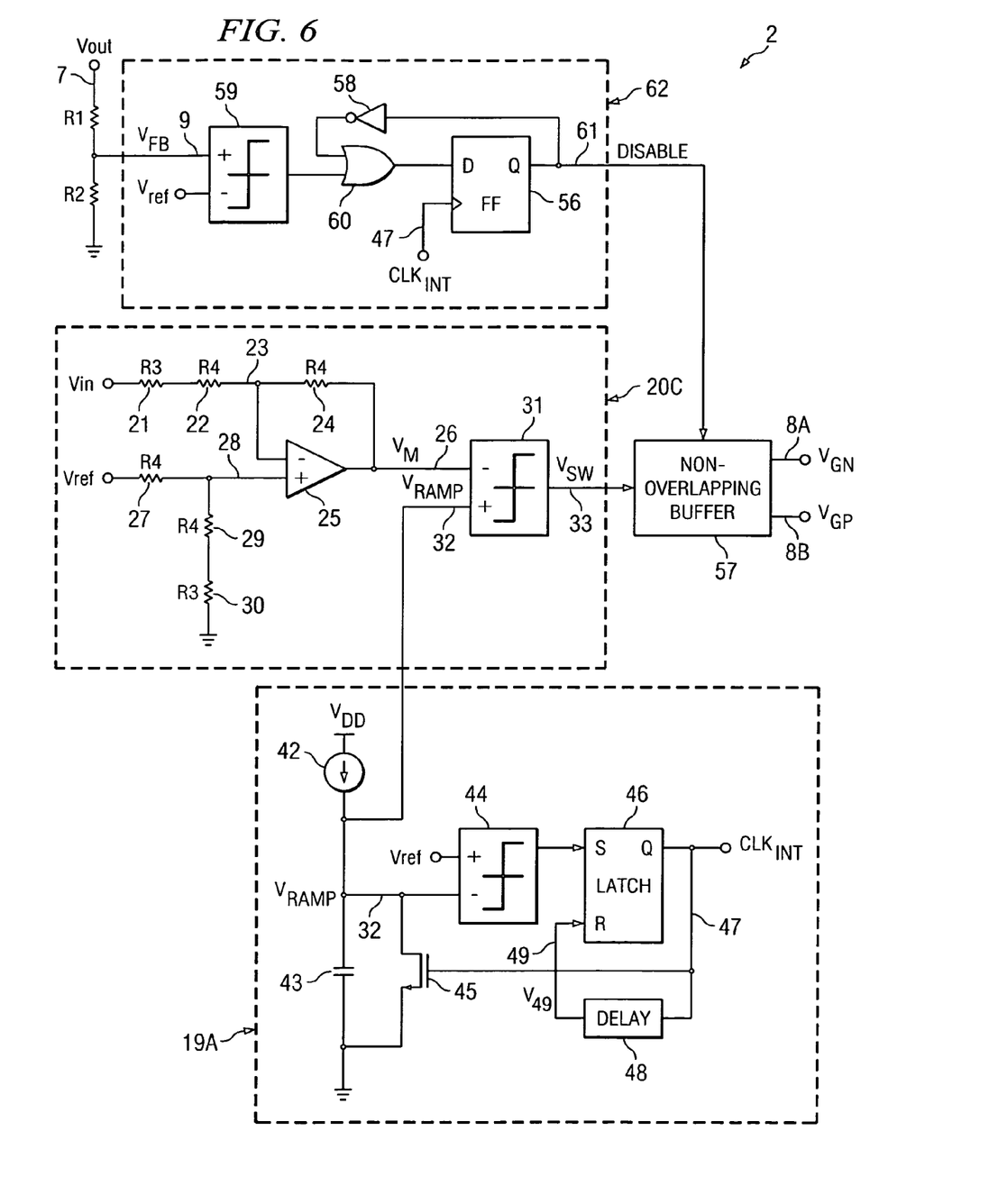
FIG. 6 is a detailed block diagram of an implementation of the predictive duty cycle control circuit in block 2 FIG. 4A.
Figure 7A:
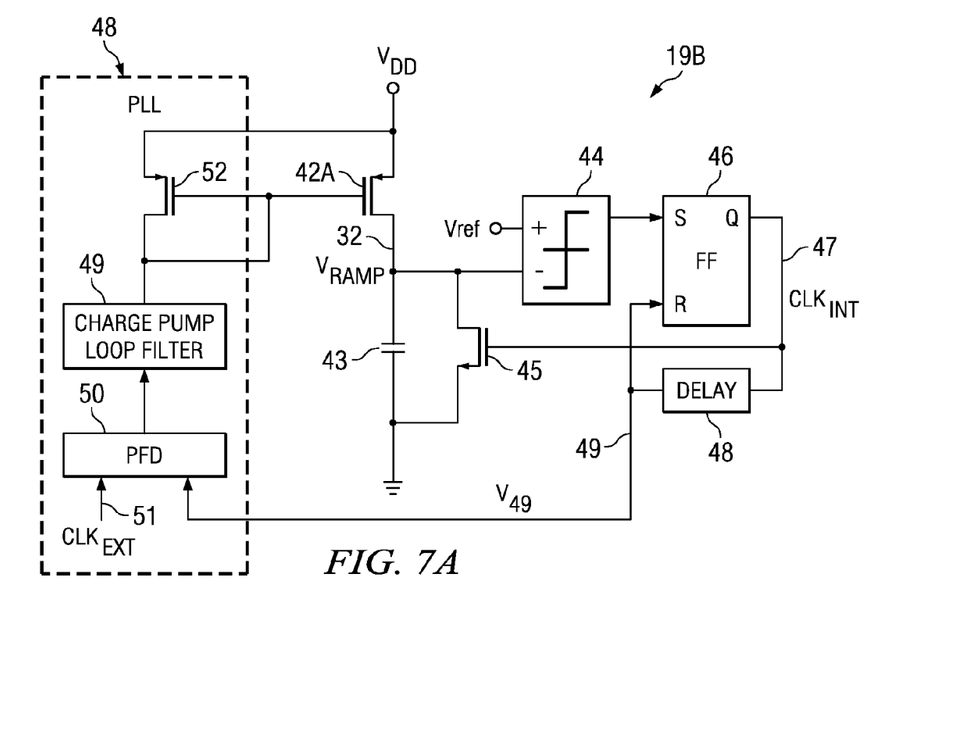
FIG. 7A is a block diagram of an improved ramp voltage generator circuit which can be used instead of the circuitry in block 19A of FIG. 6 to synchronize operation of the predictive duty cycle controller with an external clock signal.

The (+) input of comparator 31 in FIG. 4B is coupled by conductor 32 to receive a ramp signal $V_{RAMP}$, which can be generated by, for example, either the ramp generator circuit 19B shown in FIG. 6 or the externally clocked ramp generator circuit 19B shown in FIG. 7. The height of the ramp voltage is designed to be Vref, and the width of the ramp voltage corresponds to the clock signal. The ratio of resistance R3 to resistance R4 should be chosen to match the ratio of resistance R1 to resistance R2. Comparator 31 produces the switch control signal $V_{SW}$ which is applied by means of conductor 33 to the input of a non-overlapping buffer circuit 57 in FIG. 6 which produces non-overlapping gate control signals $V_{GN}$ and $V_{GP}$, as shown in FIG. 4C on conductors 8A and 8B, respectively, (which as previously mentioned, are connected to the gates of N-channel power transistor 3 and P-channel output power transistor 11, respectively).

Figure 4C:
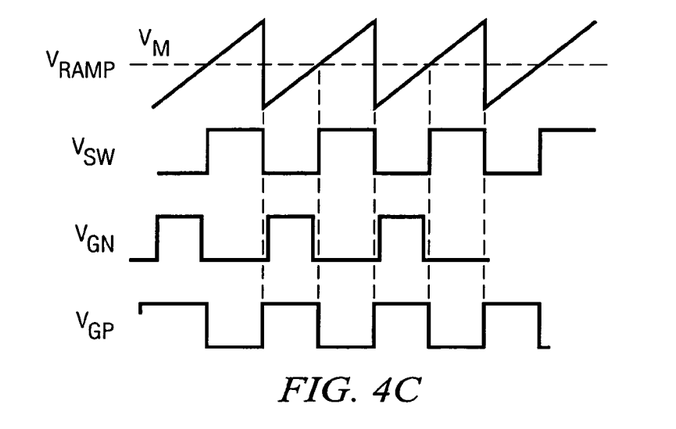
FIG. 4C is a timing diagram showing the waveforms of various signals in the circuits of FIGS. 4A and 4B.

As shown in the timing diagram of FIG. 4C, the beginning of each switching cycle of transistors 3 and 11 is the time at which N-channel output power transistor 3 is turned on to start the ramp-up or build-up of inductor current $I_L$. That occurs at the beginning of the ramp-up of $V_{RAMP}$. N-channel transistor 3 is switched off and P-channel transistor 11 is switched on at the instant at which $V_{RAMP}$ crosses the value of duty ratio control voltage $V_M$ produced by duty ratio circuit 20C of FIG. 4B. At the end of the period of an internal clock signal $CLK_{INT}$ (produced on conductor 47 in FIG. 6), inductor current $I_L$ will have ramped back down to approximately its initial value, i.e. to zero. The value of duty ratio control voltage $V_M$ controls the predictive duty cycle of the switch control signal $V_{SW}$ on conductor 33 so as to ensure that the inductor current $I_L$ decays to zero at precisely the instant that synchronous switching transistor 11 is turned off. $V_M$ as a percentage of Vref by design corresponds to the duty ratio of a lossless boost converter operating in PWM mode. Those skilled in the art will understand that this particular relationship ensures that the inductor current decays to zero at the end of each cycle.

In accordance with the present invention, synchronous DC-to-DC boost converter 10 of FIG. 4A sets the subsequently described predictive duty cycle of $V_{SW}$ produced on conductor 33 in FIG. 4B to an optimal fixed "duty ratio" based upon its input/output voltage relationship, rather than by controlling the precise turn-off times of power output transistor 11. The duty ratio coincides with the an ideal predictive duty cycle ratio of a lossless boost converter (with fixed Vout), in order to ensure that the inductor current $I_L$ at the end of each switching cycle (i.e., each cycle of $CLK_{INT}$) will be same as at the beginning of the switching cycle.

The duty ratio in a boost converter is D=(Vout−Vin)/Vout. If the system is operating in PFM (pulse-frequency-modulation) mode where the starting value of inductor current $I_L$ in each ramp-up, ramp-down cycle is designed to be zero, then at the end of each cycle of internal clock $CLK_{INT}$ the values of the inductor current $I_L$ should return to approximately zero. That eliminates the need for a high speed, high precision comparator. The duty ratio D=(Vout−in)/Vout is relatively accurate since in PFM mode the load current is small and the IR loss is relatively small.

In the design of predictive duty ratio generation circuit 20C shown in FIG. 4B, the output voltage Vout is fixed. That allows the duty ratio generation to be achieved by means of resistive divider R1 and R2 as shown in FIG. 4B, the output of which produces a duty ratio control voltage $V_M$ on the (−) input of comparator 31, such that $$V_M = Vref - Vin \times R4/(R3+R4).$$

$V_M$ is compared by comparator 31 to ramp voltage $V_{RAMP}$, which is applied to the (+) input of comparator 31 of ramp generator circuit 19B in FIG. 7. The amplitude of $V_{RAMP}$ is set to the value of the reference voltage Vref by the circuitry shown in FIG. 7, and the width of $V_{RAMP}$ is set by the duration of one period of the clock signal $CLK_{INT}$. Consequently, the duty ratio D produced is $$D = V_M/Vref = 1 - Vin \times R4/\{Vref \times (R3+R4)\},$$

wherein the resistances of resistors R1, R2, R3, and R4 are selected such that R3/R4=R1/R2.

Since Vout is equal to Vref×(R1+R2)/R2, it follows that the duty ratio D is given by $$D = 1 - Vin/Vout = (Vout - Vin)/Vout.$$

If inductor current $I_L$ starts at zero (which often is the case in PFM mode operation wherein the load current demand is relatively low), the losses through transistors 3 and 11 are small enough that the predictive duty ratio very accurately predicts/determines both the slope of the inductor current $I_L$ at the beginning of the $CLK_{INT}$ cycle of the inductor current $I_L$ and the duration of the inductor current $I_L$ in the $CLK_{INT}$ cycle.

The duty ratio D defined by the foregoing expression causes inductor current $I_L$ to be approximately zero at the end of each cycle. Delay in comparator 31 tends to raise the generated duty ratio D slightly higher than the ideal value. As long as the delay of comparator 31 is only a small fraction of the $CLK_{INT}$ cycle, which is typically the case, the impact of the delay in comparator 31 is minimal and is substantially less than the impact of comparator delay that occurs when using the prior art technique of individually controlling the turn-off times of output power transistor 11 in response to detecting of a direction reversal of inductor current $I_L$. Also, the effect of the input offset voltage of comparator 31 in FIG. 4B therefore is substantially less than the effect of the input offset voltage of comparator 12 in FIG. 3 using the prior art technique of controlling turn-on and turn-off times of output power transistor 11. The implementation of comparator 31 in FIG. 4B is much easier than the implementation required for comparator 12 in the prior art circuit shown in FIG. 3.

Thus, the present invention is focused on predicting/determining the optimal time to switch from N-channel transistor 3 being conductive to P-channel transistor 11 being conductive, whereas the prior art is focused on attempting to determine the individual times at which to turn P-channel transistor 11 off on the basis of detecting the direction of the inductor current $I_L$.

Figure 5:
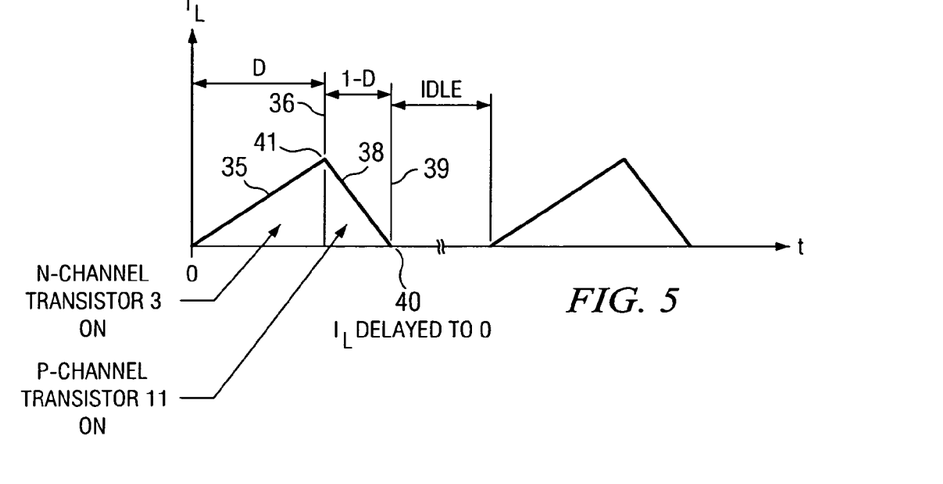
FIG. 5 is a diagram illustrating the inductor current cycle in the circuit of FIG. 4A.

Referring to FIG. 5, the present invention predicts/determines the optimum time of transition point 41 between up-ramping and down-ramping of $I_L$, as represented by vertical dashed line 36, such that the falling ramp 38 of inductor current $I_L$ causes P-channel transistor 11 to be turned off at precisely the time $I_L$ has decayed to zero. Stated differently, duty cycle D is optimally determined by the circuitry in FIG. 4B such that the ramp-up and ramp-down of inductor current $I_L$ has the waveform shown in FIG. 5. This provides the advantage that the component requirements for producing the delay times and the offset voltages are less stringent than is the case for the prior art. To allow inductor current $I_L$ to completely ramp down to zero as shown in FIG. 5 before starting the next switching cycle, each ramp-up, ramp-down cycle (i.e., charge pumping cycle) during the PFM mode operation is always followed by an "idle" time (i.e., no-charge-pumping time), to avoid false operation. The circuits of FIGS. 4A and 4B result in the build-up or ramp-up 35 of inductor current $I_L$ in FIG. 5 during the fraction D of each switching cycle, and also result in the ramp-down 38 of $I_L$ occurs during the fraction 1−D of the switching cycle, because when N-channel transistor 3 is on, the inductor current build-up or ramp-up rate is equal to Vin/L, and the inductor current decay or ramp-down rate is set by Vout−Vin/L. Assuming steady state conditions, the value of inductor current $I_L$ ends up at the same value as the value at which it begins in the ramp-up/ramp-down cycle. By equating Vin/L×D to (Vout−Vin)/×*(1−D), the expression D=1−Vin/Vout can be readily derived.

Stated differently, the duty ratio control voltage $V_M$ has a value that corresponds to a duty ratio D of a ramp-up, ramp-down cycle of inductor current $I_L$ wherein the duty ratio D is the fraction of the period of the ramp-up, ramp-down cycle during which N-channel transistor 3 is on and 1−D is the fraction of the period of the ramp-up, ramp-down cycle during which P-channel transistor 11 is on, wherein the duty ratio D is represented by the simultaneous equations D=1−Vin/Vout and D=Vin/Vref.

Briefly, in PFM (pulse-frequency modulation) mode, synchronous DC-to-DC boost converter operates to cause $I_L$ to ramp up no more frequently than every other internal clock cycle. The reason for the pause or idle time in $I_L$ down-ramping operation during one or more successive internal clock cycles is to ensure that inductor current $I_L$ has completely ramped down to zero before beginning a new ramping cycle. This is desirable because a small negative value of $I_L$ would result in an undesirable increasing amount of reverse inductor current back-flowing into the source of the input voltage Vin if the ramping operation were to continue. (However, conventional PWM circuitry (not shown) can also be provided in boost converter 10 to accommodate the case wherein load current demand increases beyond the level that can be supplied by the above described $I_L$ ramping (i.e., charge pumping) every other clock cycle in PFM mode operation. (Operation of boost converter 10 can be automatically switched from PFM (pulse-frequency modulation) operation to ordinary PWM (pulse width modulation) operation in the presence of heavy load current demand using conventional techniques wherein $I_L$ ramping (charge pumping) occurs every internal $CLK_{INT}$ clock cycle and wherein the duty cycle of the $I_L$ ramping up/down time is continuously adjusted according to the load current demand. Note that under high load current demand conditions the minimum value of $I_L$ is sufficiently high that there is no problem with $I_L$ direction reversal.)

More specifically, and referring to FIG. 6, predictive duty cycle controller 2 of FIG. 4A includes a PFM regulating circuit 62 which receives feedback voltage $V_{FB}$ on conductor 9 and an internal clock signal $CLK_{INT}$ on conductor 47 and generates a regulating or controlling signal DISABLE on conductor 61. The signal DISABLE is applied to a disable or control input of a conventional non-overlapping buffer circuit 57 which produces the non-overlapping gate control signals $V_{GN}$ and $V_{GP}$ on conductors 8A and 8B, respectively. Regulating circuit 62 includes a comparator 59 having its (+) input coupled to receive feedback signal $V_{FB}$ and its (−) input coupled to receive Vref. The output of comparator 59 is connected to one input of an OR gate 60 having its output connected to the input of a D-type flip-flop 56. The clock input of flip-flop 56 is connected to internal clock signal $CLK_{INT}$ and its output is connected by conductor 61 to produce the signal DISABLE on the input of an inverter 58, the output of which is connected to the other input of OR gate 59 (or other circuit which performs a logical OR'ing function).

Comparator 59 in FIG. 6 compares feedback voltage $V_{FB}$ which is scaled down from the value of Vout to the value of Vref, with the result that if $V_{FB}$ greater than Vref (meaning that Vout is a bit too high), then regulating circuit 62 will go into its pause or idle time or mode during which no more charge will be pumped to be eventually delivered by boost converter 10 to load 15. However, if Vout is less than desired, regulating circuit 62 will be activated to produce charge delivering operation (provided that the prior cycle was an idle cycle), and in the next clock cycle regulating circuit 62 will begin an idle condition and remain therein until $V_{FB}$ no longer exceeds Vref. This is what is meant by PFM (pulse frequency modulation) mode. Thus, in the PFM mode, when there is a low demand for load current, boost converter 10 delivers charge to the load somewhat sporadically, i.e., only as needed to maintain Vout equal to Vref (For example, boost converter 10 may pump charge during one internal clock cycle and then be in its idle state for the next 10 cycles.) As demand for load current increases, the relative number of $I_L$ ramping or charge pumping cycles increases and the number of idle cycles correspondingly decreases.

Predictive duty cycle controller 2 as shown in FIG. 6 includes predictive duty ratio generation circuit 20C of FIG. 4B, having its output on conductor 33 connected to apply the switch control signal $V_{SW}$ to an input of non-overlapping buffer 57, causing it to generate $V_{GP}$ and $V_{GN}$ as shown in the timing diagram of FIG. 4C.

Predictive duty cycle controller 2 as shown in FIG. 6 also includes a ramp generator 19A, wherein a constant current source 42 is used to linearly charge a capacitor 43. When the voltage on conductor 32 reaches the value of reference voltage Vref, comparator 44 is triggered to turn on RS latch 46, which generates the internal clock signal $CLK_{INT}$ on conductor 47 to reset capacitor 43 and also to clock flip-flop 56. The frequency of $CLK_{INT}$ is determined by the capacitance of capacitor 43, the value of Vref, and the magnitude of the current source 42 in FIG. 6 (or current mirror output transistor 42A in FIG. 7A).

Thus, the present invention in effect "predicts" when P-channel transistor 11 should be turned off and N channel transistor 3 should be turned on, and does not use the prior art technique of determining directly when the inductor current $I_L$ reverses direction in order to determine when to turn off P-channel transistor 11.

If an external clock $CLK_{EXT}$ is to be used, one can simply use an edge of the external clock to reset capacitor 43 to slave the internal ramp generation to the external clock. However, because of typical semiconductor process variations, or if the external clock signal is intentionally skewed, a problem with ramp generator 19A in FIG. 6 is that the magnitude of $V_{RAMP}$ on conductor 33 does not always reach the same value as Vref at the end of each internal $CLK_{INT}$ cycle. If that happens, it upsets the above described the duty ratio prediction/generation scheme, as can be recognized from the above described derivation of predictive duty cycle D. (For example, if the capacitance of capacitor 43 is too small, then $V_{RAMP}$ reaches and may exceed Vref. Or, for example, if an internal oscillator is running at, for example, 800 kHz, and $CLK_{EXT}$ is running at 1 MHz, then $V_{RAMP}$ would rise only to a value less than Vref because of the reduced available amount of ramping time. Or, if $CLK_{EXT}$ runs at 600 kHz, then there is a longer amount of available ramping time which will result in $VR_{RAMP}$ reaching the value of Vref.)

Most synchronous DC-to-DC boost converters provide an option for running an external clock (e.g., $CLK_{EXT}$ in FIG. 7A) to synchronize the boost converter with respect to an external system (not shown), or perhaps to establish a desired operating frequency of the boost converter. In such cases, care needs to be taken to ensure that the magnitude of the ramp voltage (e.g., $V_{RAMP}$) always reaches the same value (i.e., Vref) as in the case wherein only an internal clock (e.g., $CLK_{INT}$ in FIG. 6) is used.

A solution to the above mentioned problems of ramp generator 19A in FIG. 6 is provided by the ramp generator 19B of FIG. 7. This solution is accomplished by using a phase locked loop (PLL) to derive an output current to charge capacitor 43 to generate $V_{RAMP}$ with a maximum voltage or height equal to the value of Vref. In FIG. 7, ramp generator 19B includes the same basic ramp voltage generating circuitry as FIG. 6, including capacitor 43, comparator 44, transistor 45, latch 46, and delay circuit 48. P-channel transistor 42A in FIG. 7 is a current mirror output transistor that performs the same function as current source 42 in FIG. 6. However, the drain of current mirror output transistor 42A is connected by conductor 32 so as to linearly charge one terminal of capacitor 43 to produce the rising edges of $V_{RAMP}$.

Figure 7B:
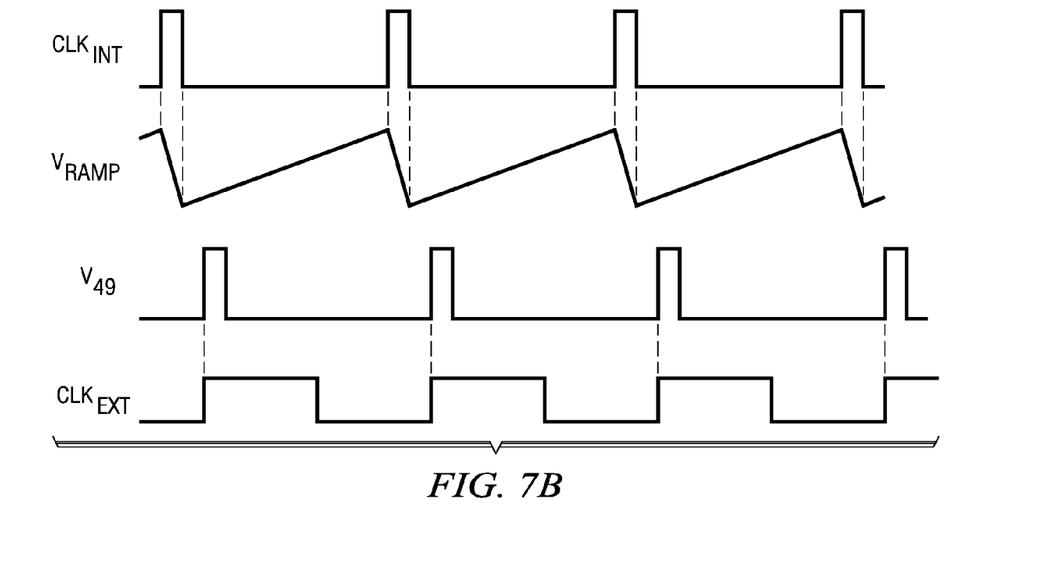
FIG. 7B is a timing diagram of waveforms of various signals in the circuit of FIG. 7A.

The other terminal of capacitor 43 is connected to a fixed reference, such as ground. Conductor 32 also is connected to the drain of a N-channel reset transistor 45, the source of which is connected to ground, and also to the (−) input of comparator 44, the (+) terminal of which is connected to Vref The output of comparator 44 is connected to the set input of RS latch 46, the output of which is connected by conductor 47 to the gate of reset transistor 45 and to one input of delay circuit 48. The output of delay circuit 48 is connected by conductor 49 to the reset input of flip-flop 46 and to a reset input of phase-frequency detector (PFD) circuit 50. When $V_{RAMP}$ is equal to Vref, comparator 44 switches flip-flop 46, causing reset transistor 45 to discharge capacitor 43 so as to produce the falling edges of $V_{RAMP}$. Delay circuit 48 allows discharge transistor 45 to be turned on long enough to completely discharge capacitor 43. This also allows a minimum width of output pulse of RS latch 46, wherein the delay circuit 48 sets the width of the $CLK_{INT}$ pulses shown in the timing diagram of FIG. 7B, and also allows the output of comparator 44 to deactivate (meaning to undergo a transition from a high to a low output level) before the delayed pulse produced by delay circuit 48 on conductor 49 arrives at the reset (R) input of latch 46, so as to avoid unintended signal glitches.

The clock input 51 of PFD (phase-frequency detector) circuit 50 is connected to receive the external clock signal $CLK_{EXT}$. The output of PFD circuit 50, which is a conventional phase frequency detector for use in a phase locked loop, is connected to the input of a conventional charge-pump-based loop filter 49, the output of which is connected to the gate and drain of a P-channel current mirror input transistor 52 and to the gate of current mirror output transistor 42A.

The phase of the pulse edge of the signal $V_{49}$ produced at the output 49 of delay circuit 48 is compared to the phase of external clock $CLK_{EXT}$ by phase-frequency detector 50, the output of which is input to charge-Palm-based loop filter 49.

Loop filter 49 then controls current mirror input transistor 44 to generate the output current in current mirror output transistor 42A. The derived signal $V_{49}$ at the output of delay circuit 48 is phase and frequency locked to external clock $CLK_{EXT}$. Therefore, phase locked loop 48 maintains the peak value of $CLK_{EXT}$ constant at Vref despite typical semiconductor process variations. Therefore, the latch output signal $CLK_{INT}$ is also phase and frequency locked with respect to external clock signal $CLK_{EXT}$, but is skewed in phase with respect to internal signal $V_{49}$ by the amount of delay produced in delay circuit 48. This is shown in the tuning diagram of FIG. 7B. Comparing the delay clock on conductor 49 with the external clock $CLK_{INT}$ effectively avoids the possibility of a "dead zone" during which the pulses of internal clock signal $CLK_{INT}$ turn on N-channel transistor 45 to discharge capacitor 43. During such a dead zone, current supplied by the phase locked loop circuitry 48 and current mirror output transistor 42A would have very little effect on $V_{RAMP}$. Delay circuit 48 shifts the comparison of $V_{RAMP}$ with Vref by comparator 44 away from the dead zone.

Thus, the present invention in effect predicts/generates the turn-on time of the power output transistor 11 so at the end of each $CLK_{INT}$ cycle the inductor current $I_L$ has ramped down to zero, in contrast to the prior art technique of controlling the turn-off time of the synchronous switch by utilizing a fast and precise comparator. This eliminates the need for a costly high speed precision comparator.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A synchronous DC-to-DC converter comprising:
   an inductor having a first terminal coupled to receive an input voltage;
   a first transistor having a first electrode coupled to a second electrode coupled to a second terminal of the inductor;
   a second transistor having a first electrode coupled to an output conductor to produce an output voltage and having a second electrode coupled to the second electrode of the first transistor;
   a feedback circuit coupled between the output conductor and the first reference voltage for producing a feedback voltage representative of a value of the output voltage; and
   a predictive duty cycle controller that receives the input voltage, a reference voltage, and the feedback voltage, wherein the predictive circuit provides control signals to control electrodes of the first transistor and the second transistor, and wherein the predictive duty cycle controller includes:
      a resistive network that receives the input voltage and the reference voltage;
      an amplifier having a plurality of inputs, wherein each input is coupled to the resistive network; and
      a first comparator that compares an output of the amplifier to a ramp voltage.

2. The synchronous DC-to-DC converter of claim 1 wherein the feedback circuit is a voltage divider.

3. The synchronous DC-to-DC converter of claim 1 wherein the first electrode of each of the first and second transistors is a source, the second electrode of each of the first and second transistors is a drain, and a control electrode of each of the first and second transistors is a gate.

4. The synchronous DC-to-DC converter of claim 1 wherein the first transistor is a N-channel transistor and the second transistor is a P-channel transistor.

5. The synchronous DC-to-DC converter of claim 1 wherein the resistive network further comprises:
   a first divider coupled between the input voltage and the output of the operational amplifier; and
   a second resistive divider circuit coupled between the second reference voltage and the first reference voltage.

6. The synchronous DC-to-DC converter of claim 5 wherein the first divider further comprises:
   a first resistor coupled to the input voltage;
   a second resistor coupled to the first resistor; and
   a third resistor coupled between the second resistor and the output of the operational amplifier.

7. The synchronous DC-to-DC converter of claim 6 wherein the second divider further comprises:
   a fourth resistor coupled to the reference voltage;
   a fifth resistor coupled to the fourth resistor; and
   a sixth resistor coupled between the fifth resistor and a second reference voltage.

8. The synchronous DC-to-DC converter of claim 7 wherein a resistance of the second resistor is equal to a resistance of the third resistor and a ratio of a resistance of the first resistor to the resistance of the second resistor is equal to a ratio of a resistance of a first resistor of the voltage divider to a resistance of a second resistor of the voltage divider, and wherein a resistance of the fourth resistor is equal to a resistance of the fifth resistor and a ratio of a resistance of the sixth resistor to the resistance of the fifth resistor is equal to the ratio of the resistance of the first resistor of the voltage divider to the resistance of the second resistor of the voltage divider.

9. The synchronous DC-to-DC converter of claim 1 wherein the predictive duty cycle controller further comprises:
   a second comparator that compares the feedback voltage to the reference voltage;
   a logic circuit that receives an output of the second comparator; and
   a flip-flop that receives an output from the logic circuit and that is clocked by a first clock signal, and wherein an inverted output of the flip-flop is fed back to the logic gate.

10. The synchronous DC-to-DC converter of claim 1 wherein the ramp voltage is generated by a ramp voltage generator including:
    a current source coupled to the first comparator and to a capacitor;
    a second comparator that is coupled to the reference voltage and the current source;
    a latch that receives an output from the second comparator, wherein the output of the latch is a first internal clock signal;
    a delay circuit that receives the first internal clock signal and that outputs a delayed signal to the latch; and
    a capacitor-resetting transistor that is generally in parallel to the capacitor and that receives the first internal clock signal at its control electrode.

11. The synchronous DC-to-DC converter of claim 10 wherein the current source further comprises:
    a current mirror;
    a phase locked loop that controls the current mirror, wherein the phase locked loop includes:

a phase-frequency detector circuit that is clocked by a second clock signal and that receives the delayed signal; and
a charge pump loop filter having an input coupled to an output of the phase-frequency detector and an output coupled to an input of the current mirror.

12. The synchronous DC-to-DC converter of claim 1 wherein the predictive duty cycle controller further comprises a non-overlapping buffer.

13. An apparatus comprising:
a boost converter that receives an input voltage and that outputs an output voltage, wherein the boost converter includes a plurality of power switches;
a feedback circuit that receives the output voltage and produces a feedback voltage; and
a predictive duty cycle controller that receives the input voltage, a reference voltage, and the feedback voltage, wherein the predictive circuit provides control signals to the plurality of power switches, and wherein the predictive circuit includes:
a resistive network that receives the input voltage and the reference voltage;
an amplifier having a plurality of inputs, wherein each input is coupled to the resistive network; and
a first comparator that compares an output of the amplifier to a ramp voltage.

14. The apparatus of claim 13 wherein the feedback circuit is a voltage divider.

15. The apparatus of claim 13 wherein the resistive network further comprises:
a first divider coupled between the input voltage and the output of the operational amplifier; and
a second resistive divider circuit coupled between the second reference voltage and the first reference voltage.

16. The synchronous DC-to-DC converter of claim 15 wherein the first divider further comprises:
a first resistor coupled to the input voltage;
a second resistor coupled to the first resistor; and
a third resistor coupled between the second resistor and the output of the operational amplifier.

17. The synchronous DC-to-DC converter of claim 16 wherein the second divider further comprises:
a fourth resistor coupled to the reference voltage;
a fifth resistor coupled to the fourth resistor; and
a sixth resistor coupled between the fifth resistor and a second reference voltage.

18. The apparatus of claim 13 wherein the predictive duty cycle controller further comprises:
a second comparator that compares the feedback voltage to the reference voltage;
a logic circuit that receives an output of the second comparator; and
a flip-flop that receives an output from the logic circuit and that is clocked by a first clock signal, and wherein an inverted output of the flip-flop is fed back to the logic gate.

19. The apparatus of claim 13 wherein the predictive duty cycle controller further comprises a ramp voltage generator that generates the ramp voltage, wherein the ramp voltage generator includes:
a current source coupled to the first comparator and to a capacitor;
a second comparator that is coupled to the reference voltage and the current source;
a latch that receives an output from the second comparator, wherein the output of the latch is a first internal clock signal;
a delay circuit that receives the first internal clock signal and that outputs a delayed signal to the latch; and
a capacitor-resetting transistor that is generally in parallel to the capacitor and that receives the first internal clock signal at its control electrode.

20. The apparatus of claim 19 wherein the current source further comprises:
a current mirror;
a phase locked loop that controls the current mirror, wherein the phase locked loop includes:
a phase-frequency detector circuit clocked by a second clock signal and that receives the delayed signal; and
a charge pump loop filter having an input coupled to an output of the phase-frequency detector and an output coupled to an input of the current mirror.

21. The apparatus of claim 13 wherein the predictive duty cycle controller further comprises a non-overlapping buffer.

22. An apparatus comprising:
a boost converter that receives an input voltage and outputs an output voltage, wherein the boost converter includes a plurality of power switches;
a feedback circuit that receives the output voltage and produces a feedback voltage; and
a regulating circuit that receives the feedback voltage and the a reference voltage;
a duty ratio generator that receives the input voltage and the reference voltage, wherein the duty ratio generator outputs a first internal clock signal for the regulating circuit and outputs a switch control signal; and
a non-overlapping buffer that receives the switch control signals and an output of the regulating circuit and that outputs actuation signals to the plurality of switches, wherein the output of the regulating circuit causes the synchronous DC-to-DC converter to operate in a pulse-frequency modulation mode.

23. The apparatus of claim 22 wherein the feedback circuit is a voltage divider.

24. The apparatus of claim 22 wherein the regulating circuit further comprises:
a second comparator that compares the feedback voltage to the reference voltage;
a logic circuit that receives an output of the second comparator; and
a flip-flop that receives an output from the logic circuit and that is clocked by a first clock signal, and wherein an inverted output of the flip-flop is fed back to the logic gate.

25. The apparatus of claim 22 wherein the duty ratio generator further comprises a ramp voltage generator that generates the ramp voltage, wherein the ramp voltage generator includes:
a current source coupled to the first comparator and to a capacitor;
a second comparator that is coupled to the reference voltage and the current source;
a latch that receives an output from the second comparator, wherein the output of the latch is a first internal clock signal;
a delay circuit that receives the first internal clock signal and that outputs a delayed signal to the latch; and
a capacitor-resetting transistor that is generally in parallel to the capacitor and that receives the first internal clock signal at its control electrode.

26. The apparatus of claim 25 wherein the current source further comprises:
   a current mirror;
   a phase locked loop that controls the current mirror, wherein the phase locked loop includes:
      a phase-frequency detector circuit clocked by a second clock signal and that receives the delayed signal; and
      a charge pump loop filter having an input coupled to an output of the phase-frequency detector and an output coupled to an input of the current mirror.

* * * * *